US005697063A

United States Patent [19]

Kishigami et al.

[11] Patent Number: 5,697,063

[45] Date of Patent: Dec. 9, 1997

[54] INDOOR RADIO COMMUNICATION SYSTEM

[75] Inventors: Takaaki Kishigami, Kawasaki; Makoto Hasegawa; Morikazu Sagawa, both of Tokyo; Mitsuo Makimoto, Yokohama, all of Japan

[73] Assignee: Matsushita Electric Industrial Co., Ltd., Osaka, Japan

[21] Appl. No.: 649,566

[22] Filed: May 17, 1996

[30] Foreign Application Priority Data

May 30, 1995 [JP] Japan .................................... 7-131336
Sep. 18, 1995 [JP] Japan .................................... 7-238086

[51] Int. Cl.[6] ............................................ H04B 7/14

[52] U.S. Cl. ............................................ 455/53.1; 455/25

[58] Field of Search ........................... 455/11.1, 25, 33.1, 455/54.1, 67.2; 343/781 P, 781 R, 940, DIG. 2, 781 CA, 784

[56] References Cited

U.S. PATENT DOCUMENTS

| | | | |
|---|---|---|---|
| 2,598,064 | 5/1952 | Lindenblad | 455/11.1 |
| 3,302,205 | 1/1967 | Johnson | 455/67.2 |
| 3,308,463 | 3/1967 | Emerson | 455/67.2 |
| 3,406,401 | 10/1968 | Tillotson | 455/25 |
| 3,701,160 | 10/1972 | Beguin | 343/755 |
| 4,260,997 | 4/1981 | Fukui | 346/108 |
| 4,282,530 | 8/1981 | Semplak | 343/784 |
| 4,489,331 | 12/1984 | Salvat et al. | 343/781 CA |
| 4,574,288 | 3/1986 | Sillard et al. | 343/781 P |
| 4,928,317 | 5/1990 | Franchini | 359/145 |
| 5,317,328 | 5/1994 | Allen | 343/781 R |

FOREIGN PATENT DOCUMENTS

| | | |
|---|---|---|
| 63-59029 | 3/1988 | Japan . |
| 63-138840 | 6/1988 | Japan . |
| 3268520 | 11/1991 | Japan . |
| 5284076 | 10/1993 | Japan . |

OTHER PUBLICATIONS

Harry Stockman, "Communication by means of reflected power," The Institute of Radio Engineers, Oct. 1948.

*Primary Examiner*—Reinhard J. Eisenzopf
*Assistant Examiner*—Sam Bhattacharya
*Attorney, Agent, or Firm*—Lowe, Price, LeBlanc & Becker

[57] ABSTRACT

A master station master antenna having a high directivity in an upper direction, a slave station and a slave antenna having a high directivity in the high direction are arranged on a floor of a room, and furniture is arranged on the floor between the master antenna and the slave antenna. Also, a master reflecting mirror is arranged on a ceiling of the room placed just above the master antenna, and a slave reflecting mirror is arranged on the ceiling placed just above the slave antenna. When an electric wave having a data signal is radiated from the master station, the electric wave radiated in the upper direction passes through a first transmission route and is reflected by the master reflecting mirror toward a horizontal direction. Thereafter, the electric wave passes through a second transmission route near the ceiling and is again reflected by the slave reflecting mirror toward the lower direction. Thereafter, the electric wave passes through a third transmission route and is received by the slave antenna because the slave antenna has a high directivity to receive the electric wave transmitted from the upper direction. Therefore, the data signal can be reliably detected by the slave station without being interrupted by the furniture.

41 Claims, 8 Drawing Sheets

INDOOR RADIO COMMUNICATION SYSTEM

BACKGROUND OF THE INVENTION

1. Field of the Invention

The present invention relates to an indoor radio communication system in which a radio communication such as a millimeter wave communication is performed in a limited space such as a room by using a small sized antenna having a high directivity.

2. Description of the Related Art

A communication system in which a master station and each of slave stations set in a room are connected to each other through a wire circuit and in which a data transmission is performed between the master station and each slave station has been recently spread. Therefore, the flexibility for the arrangement of the slave stations and the mobility for the slave stations are required of the communication system with the spread of the communication system, and an indoor radio communication system in which the master station and each slave station are connected to each other through a radio communication circuit has been given consideration.

For example, a low speed data transmission system in which a low intensity of electric wave in a UHF band is used has been briskly introduced as one indoor radio communication system. Also, a high speed data transmission method using a quasi-micro wave and a quasi-millimeter wave is standardized and has been recently spread. In addition, a high speed data transmission method using a millimeter wave is ready to be standardized.

In cases where a high speed data transmission is performed through a radio circuit, it is required to heighten a frequency band of an electric wave used for the high speed data transmission. Therefore, the property of the electric wave becomes close to that of light, and a rectilinear propagation property of the electric wave is strengthened. In this case, because a wave length of the electric wave is shortened, a small sized antenna having a high directivity can be used.

2.1. Previously Proposed Art

A conventional indoor radio communication system using a millimeter wave is described. FIG. 1 shows a conventional indoor radio communication system using a millimeter wave.

As shown in FIG. 1, in a conventional indoor radio communication system 11, a master station 12, a master antenna 13 attached to the master station 12, a plurality of slave stations 14 and a plurality of slave antennas 15 attached to the slave stations 14 are set in a room surrounded by walls and ceiling 16. When an electric wave such as a millimeter wave is transmitted from the master antenna 13 of the master station 12, the electric wave is directly received by the slave antennas 15 of the slave stations 14. Also, the electric wave is reflected by the walls and ceiling 16 or furnishings 17 such as a household furniture, a desk and a partition screen, and the reflected electric wave is received by the slave antennas 15 of the slave stations 14. Therefore, a data transmission between the master station 12 and each slave station 14 is performed.

Accordingly, because any cable as a wire circuit is not required for the data transmission, the slave stations 14 can be flexibly arranged in the room.

2.2. Problems to be Solved by the Invention

However, because not only the electric wave is directly received by the slave antennas 15 of the slave stations 14 without being reflected by the walls and ceiling 16 or the furnishings 17 but also the electric wave reflected by the walls and ceiling 16 or the furnishings 17 is received by the slave antennas 15 of the slave stations 14, a direct transmission route and a plurality of reflected transmission routes are formed, and a plurality of delay waves having different delay times are generated in the conventional indoor radio communication system 11. Therefore, there is a drawback that a transmission signal carried by the electric wave is distorted when the transmission signal is received by the slave antennas 14 and a transmission speed of the signal is limited. Also, because the data transmission is easily obstructed by a person or the furnishings 17, there is another drawback that the cutoff of the data transmission path easily occurs and a receiving level of the signal easily fluctuates.

SUMMARY OF THE INVENTION

An object of the present invention is to provide, with due consideration to the drawbacks of such a conventional indoor radio communication system, an indoor radio communication system in which only a single data transmission path is formed by preventing the formation of a reflected transmission path and is not disturbed by a person or furniture, and a high speed data transmission is stably performed with a high quality. The single data transmission path not disturbed by a person or furniture is formed by using a rectilinear propagation property of the millimeter wave and a high directivity of a small sized antenna.

The object is achieved by the provision of an indoor radio communication system, comprising:

a master antenna having a high directivity for radiating an electric wave at a narrowed beam width in a first vertical direction, the electric wave carrying a data signal;

a first electric wave receiving/transmitting means for receiving the electric wave radiated from the master antenna in the first vertical direction and transmitting the electric wave in a horizontal direction;

a second electric wave receiving/transmitting means for receiving the electric wave transmitted in the horizontal direction by the first electric wave receiving/transmitting means and transmitting the electric wave in a second vertical direction opposite to the first vertical direction; and a slave antenna having a high directivity for receiving the electric wave transmitted in the second vertical direction by the second electric wave receiving/transmitting means.

In the above configuration, when an electric wave is radiated from the master antenna at a narrowed beam width in a first vertical direction such as an upper direction in a room, the electric wave is received by the first electric wave receiving/transmitting means placed just above the master antenna and is transmitted in a horizontal direction parallel to a ceiling of the room. Therefore, the electric wave pass through an area near the ceiling. Thereafter, the electric wave is received by the second electric wave receiving/transmitting means attached to the ceiling and is transmitted in a second vertical direction such as a lower direction. Thereafter, the electric wave is received by the slave antenna placed just below the second electric wave receiving/transmitting means.

Accordingly, even though furniture is arranged in the room or a person exists in the room, because the microwave is transmitted in the upper and lower directions and in the area near the ceiling, the transmission of the electric wave carrying a data signal is not interrupted by the furniture or the person. Therefore, because the generation of an unnecessary electric wave or an unnecessary diffracted wave is prevented, a signal transmission can be performed at a high quality without applying a compensating technique such as an antenna diversity technique or an equalization technique for compensating for the cutoff of a signal transmission route and the distortion of the data signal, and the indoor radio communication system can be downsized and manufactured at a low cost.

The object is also achieved by the provision of an indoor radio communication system, comprising:

a master antenna having a high directivity for radiating an electric wave at a narrowed beam width in a first vertical direction, the master antenna being set in a first room, and the electric wave carrying a data signal;

a first electric wave receiving/transmitting means set in the first room for receiving the electric wave radiated from the master antenna in the first vertical direction and transmitting the electric wave in a horizontal direction;

a second electric wave receiving/transmitting means set in the first room for receiving the electric wave transmitted in the horizontal direction by the first electric wave receiving/transmitting means and transmitting the electric wave to a second room through an electric wave path; and a slave antenna having a high directivity for receiving the electric wave transmitted through the electric wave path by the second electric wave receiving/transmitting means, the first slave antenna being set in the second room.

In the above configuration, when an electric wave is radiated from the master antenna at a narrowed beam width in a first vertical direction such as an upper direction in a first room, the electric wave is transmitted to a second room through the first electric wave receiving/transmitting means, the second electric wave receiving/transmitting means and the electric wave path. Thereafter, the electric wave is received by the slave antenna having a high directivity in the second room.

Accordingly, even though the room in which the slave antenna is placed differs from that in which the master antenna is placed, the electric wave radiated from the master antenna can be reliably received by the slave antenna. Therefore, it is not required to additionally set a master antenna in the second room, and the system can be manufactured at a low cost.

Also, even though furniture is arranged in the first or second room or a person exists in the first or second room, because the microwave is transmitted in the vertical direction such as an upper or lower direction and in the area near a ceiling or a floor, the transmission of the electric wave carrying a data signal is not interrupted by the furniture or the person. Therefore, because the generation of an unnecessary electric wave or an unnecessary diffracted wave is prevented, a signal transmission can be performed at a high quality without applying a compensating technique such as an antenna diversity technique or an equalization technique for compensating for the cutoff of a signal transmission route and the distortion of the data signal, and the indoor radio communication system can be downsized and manufactured at a low cost.

The object is also achieved by the provision of an indoor radio communication system, comprising:

a master antenna having a high directivity for radiating an electric wave in all horizontal directions of a thinned horizontal plane near a ceiling of a room, the electric wave carrying a data signal;

a first electric wave receiving/transmitting means for receiving the electric wave radiated from the master antenna in one of the horizontal directions and transmitting the electric wave in a lower direction; and a slave antenna having a high directivity for receiving the electric wave transmitted by the first electric wave receiving/transmitting means in the lower direction.

In the above configuration, the master antenna is arranged on a wall of the room near the ceiling of the room. When an electric wave in all horizontal directions of a thinned horizontal plane near the ceiling is radiated by the master antenna because the master antenna has a high directivity, the electric wave radiated in one of the horizontal directions is received by the first electric wave receiving/transmitting means and is transmitted in the lower direction. Because the slave antenna is placed just below the first electric wave receiving/transmitting means, the electric wave is received by the slave antenna.

Accordingly, even though furniture is arranged in the room or a person exists in the room, because the microwave is transmitted in the lower direction and in an area near the ceiling, the transmission of the electric wave carrying a data signal is not interrupted by the furniture or the person. Therefore, because the generation of an unnecessary electric wave or an unnecessary diffracted wave is prevented, a signal transmission can be performed at a high quality without applying a compensating technique such as an antenna diversity technique or an equalization technique for compensating for the cutoff of a signal transmission route and the distortion of the data signal, and the indoor radio communication system can be downsized and manufactured at a low cost.

BRIEF DESCRIPTION OF THE DRAWINGS

The objects, features and advantages of the present invention will be apparent from the following description taken in conjunction with the accompanying drawings, in which.

DETAIL DESCRIPTION OF THE EMBODIMENTS

Preferred embodiments of an indoor radio communication system according to the present invention are described with reference to drawings.

Figure 1:
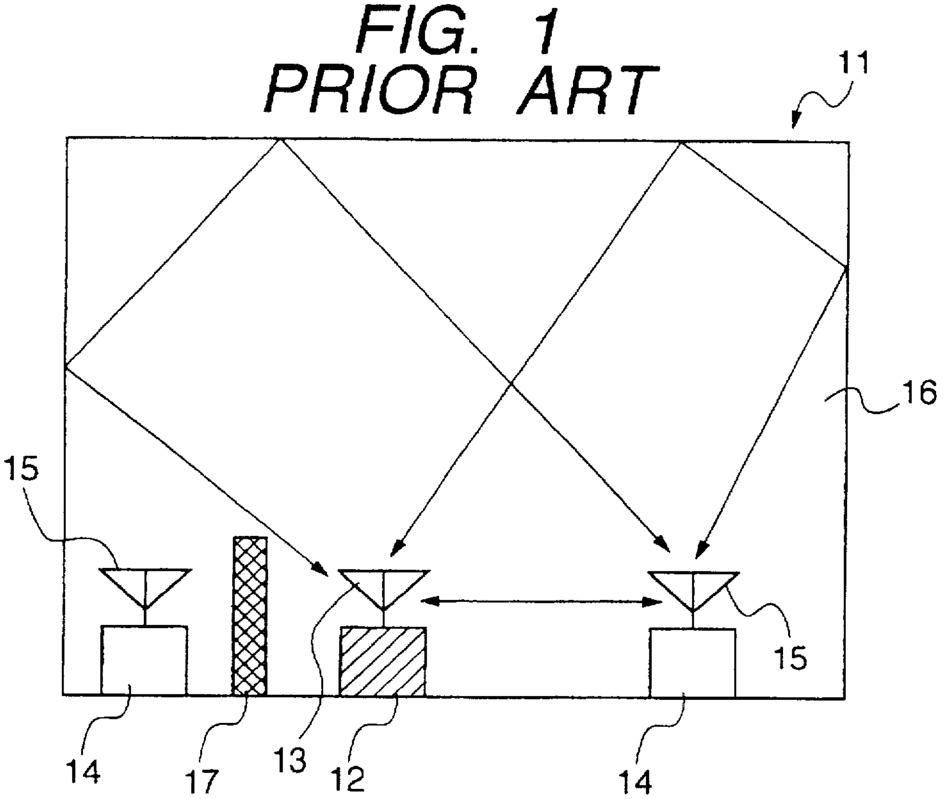
FIG. 1 PRIOR ART
FIG. 1 shows a conventional indoor radio communication system using a millimeter wave.
Figure 2:
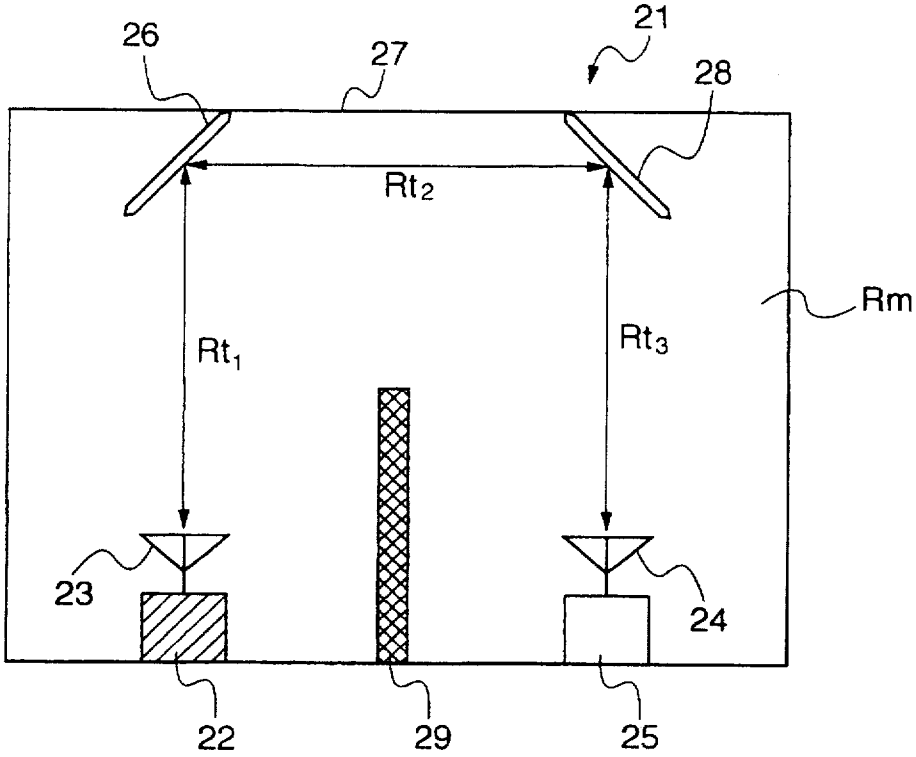
FIG. 2 is a conceptual view of an indoor radio communication system according to a first embodiment of the present invention.

FIG. 2 is a conceptual view of an indoor radio communication system according to a first embodiment of the present invention.

As shown in FIG. 2, an indoor radio communication system 21 comprises a master station 22 for producing an electric wave carrying a data signal and detecting a data signal of a received electric wave, a master antenna 23, which is connected with the master station 22 and has a high directivity in the upper direction, for radiating the electric wave at a narrowed beam width in the upper direction and receiving the electric wave transmitted from the upper direction, a slave antenna 24 having a high directivity in an upper direction for radiating an electric wave carrying a data signal at a narrowed beam width in the upper direction and receiving the electric wave transmitted from the upper direction, a slave station 25 for detecting the data signal of the electric wave received by the slave antenna 24 and producing the electric wave radiated from the slave antenna 24, a master reflecting plane mirror 26 attached to a ceiling 27 of a room Rm for reflecting the electric wave radiated from the master antenna 23 in a particular direction, and a slave reflecting plane mirror 28 attached to the ceiling 27 for again reflecting the electric wave reflected by the master reflecting plane mirror 26 to the slave antenna 24.

A millimeter wave is, for example, used as the electric wave because the millimeter wave has a superior rectilinear propagation property.

In the above configuration, an operation of the indoor radio communication system 21 is described.

When an electric wave carrying a data signal is radiated from the master antenna 23, because the master antenna 23 has a high directivity in the upper direction, all of the electric wave having a narrow beam width passes through a transmission route Rt1 in an upper direction (or a first vertical direction) and is incident on the master reflecting plane mirror 26 placed just above the master antenna 23. Thereafter, because the master reflecting plane mirror 26 is, for example, inclined by 45 degrees with respect to the ceiling 27, the electric wave is reflected by the master reflecting plane mirror 26 in a horizontal direction parallel to the ceiling 27 and is incident on the slave reflecting plane mirror 28 while passing through a transmission route Rt2 of an area near the ceiling 27. Thereafter, because the slave reflecting plane mirror 28 is, for example, inclined by 45 degrees with respect to the ceiling 27 and is placed just above the slave antenna 24, the electric wave is reflected by the slave reflecting plane mirror 28 in the lower direction (or a second vertical direction) and is transmitted to the slave antenna 24 while passing through a transmission route Rt3. Because the slave antenna 24 has a high directivity to receive the electric wave transmitted from the upper direction, all of the electric wave is received by the slave antenna 24 and is detected by the slave station 25. Therefore, a data signal carried by the electric wave is perfectly transmitted from the master station 22 to the slave station 25 because all of the electric wave passes through the transmission routes Rt1 to Rt3, and any distortion of the transmission signal does not occur.

Also, when an electric wave carrying a data signal is radiated from the slave antenna 24, the electric wave passes through the transmission routes Rt1 to Rt3 because of a reversibility principle of the electric wave transmission, and the electric wave is received by the master antenna 23. Therefore, a signal transmission from the slave station 25 to the master station 22 can be performed in the same manner.

Accordingly, because the master and slave antennas 23 and 24 having the high directivity are used and the millimeter wave has a superior rectilinear propagation property, a data signal can reliably pass through a signal transmission route composed of the routes Rt1 to Rt3 and the master and slave reflecting plane mirrors 26 and 28 without decreasing an intensity of the data signal. That is, because any other signal transmission route is not set, the data signal received by the antenna 23 or 24 is not distorted.

Also, even though furniture 29 such as a partition screen or a person exists in the room Rm, the transmission of the signal is not interrupted by the furniture 29 or a person because the signal transmission route can be arbitrarily set by using the master and slave reflecting plane mirrors 26 and 28. In particular, the transmission routes Rt1 and Rt3 are vertically directed and the transmission route Rt2 is placed near the ceiling 27, the transmission of the signal is not interrupted by the furniture 29 or a person. Therefore, a high data transmission can be stably performed at a high quality without applying a compensating technique such as an antenna diversity technique or an equalization technique for compensating for the cutoff of the signal transmission route and the distortion of the data signal, and the indoor radio communication system 21 can be downsized and manufactured at a low cost.

Also, in cases where the slave station 25 is moved to another position, the slave reflecting plane mirror 28 is moved with the slave station 25 to be placed just above the slave station 25, and an orientation of the master reflecting plane mirror 26 is changed to direct the mirror 26 toward the slave reflecting plane mirror 28. Therefore, the slave station 25 can be easily moved while maintaining the high data transmission at a high quality.

Figure 3:
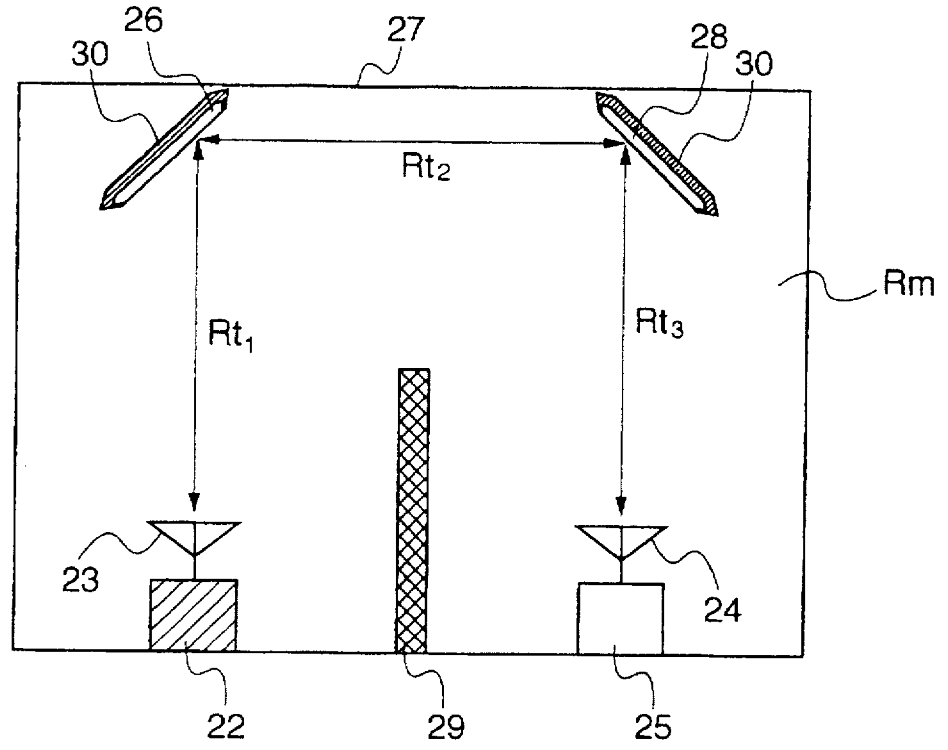
FIG. 3 is a conceptual view of an indoor radio communication system according to a first modification of the first embodiment of the present invention.

Also, as shown in FIG. 3, it is preferred that an electric wave absorber 30 be attached to periphery portions of the master reflecting plane mirror 26 and the slave reflecting plane mirror 28. In this case, even though the electric wave transmitted from the master or slave antenna 23 or 24 is not incident on the reflecting plane mirror 26 or 28 but is incident on a periphery portion of the reflecting plane mirror 26 or 28, the generation of an unnecessary reflected wave or an unnecessary diffracted wave can be prevented because the electric wave incident on the periphery portion of the reflecting plane mirror 26 or 28 is absorbed by the electric wave absorber 30. Also, because a radiation beam width of the reflected wave is narrowed, the generation of an unnecessary reflected wave not incident on the master or slave antenna 23 or 24 can be prevented.

Also, in cases where the electric wave absorber 30 is attached on portions of the ceiling 27 placed in the neighborhood of the master and slave reflecting plane mirrors 26 and 28, the generation of an unnecessary reflected wave or an unnecessary diffracted wave can be prevented in the same manner.

Figure 4:
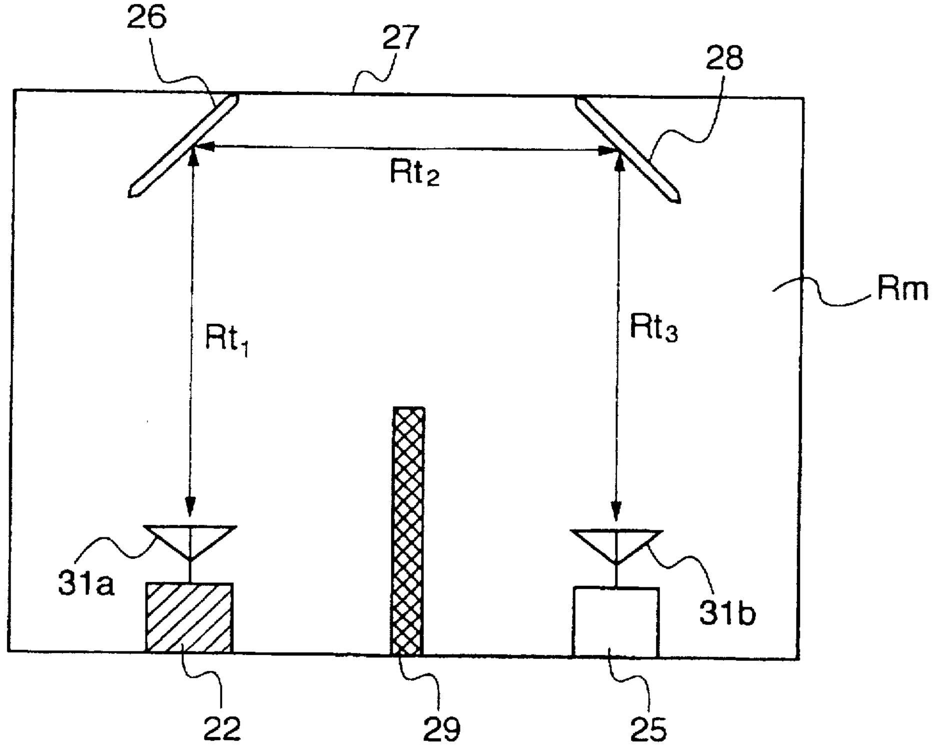
FIG. 4 is a conceptual view of an indoor radio communication system according to a second modification of the first embodiment of the present invention.

Also, as shown in FIG. 4, it is preferred that a circular polarization wave antenna 31*a* for radiating an electric wave circularly polarized in a circular direction and receiving an electric wave circularly polarized in the same circular direction be used in place of the master antenna 23 and another circular polarization wave antenna 31*b* for radiating an electric wave circularly polarized in the same circular direction and receiving an electric wave circularly polarized in the same circular direction be used in place of the slave antenna 24. In this case, a circular direction of the electric wave radiated from the circular polarization wave antenna 31*a* or 31*b* is reversed each time the electric wave is reflected by a mirror. Therefore, when an electric wave passes through the transmission routes Rt1 to Rt3, because the circular direction of the electric wave incident on the antenna 23 (or 24) is the same as that radiated from the antenna 24 (or 23), the electric wave is received by the antenna 23 (or 24). In contrast, when an electric wave passes through an undesired transmission route because of furniture 29 or a person, because the circular direction of the electric wave incident on the antenna 23 (or 24) is not necessarily the same as that radiated from the antenna 24 (or 23), the electric wave is not received by the antenna 23 (or 24). Therefore, the distortion of the data signal caused by the reception of the electric wave through an undesired data transmission path can be moreover prevented. In general, a helical antenna, a patch antenna or a slot antenna is used as the circular polarization wave antennas 31*a* and 31*b*.

Figure 5:
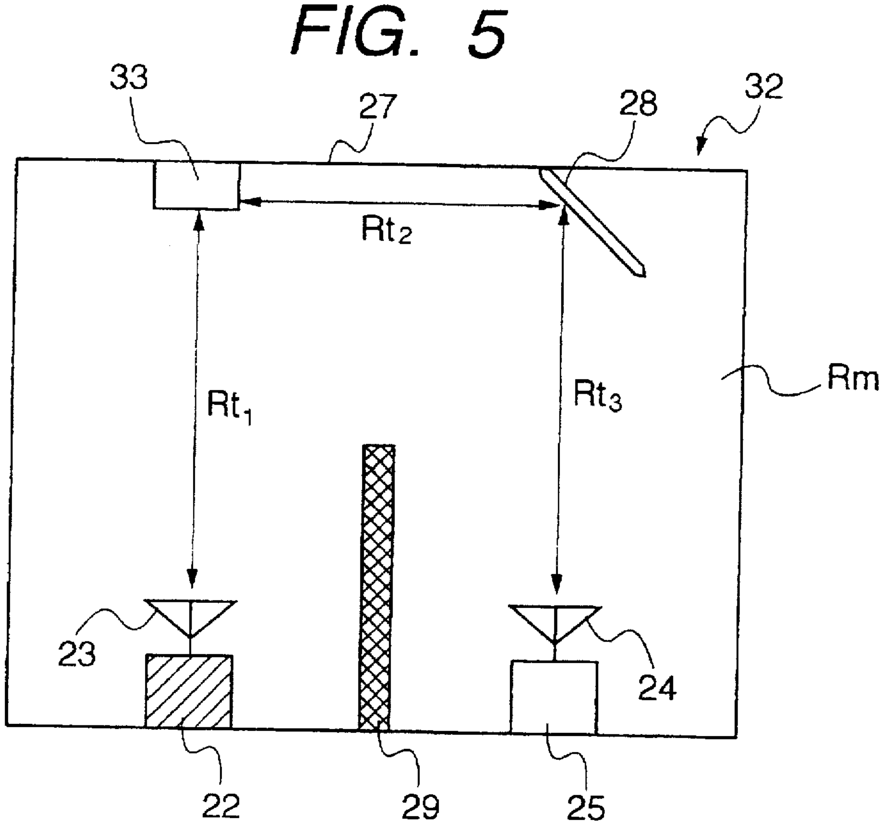
FIG. 5 is a conceptual view of an indoor radio communication system according to a third modification of the first embodiment of the present invention.

Also, as shown in FIG. 5, an indoor radio communication system 32 comprises the master station 22, the master antenna 23, the slave station 25, the slave antenna 24, the slave reflecting plane mirror 28, a repeater station 33 for amplifying a high frequency signal transmitted from the master antenna 23, transmitting the amplified signal to the mirror 28, amplifying a high frequency signal transmitted from the mirror 28 and transmitting the amplified signal to the master antenna 23. In this case, because the signal is amplified by the repeater station 33, the signal can be reliably reproduced in the master or slave station 22 or 25.

Figure 6:
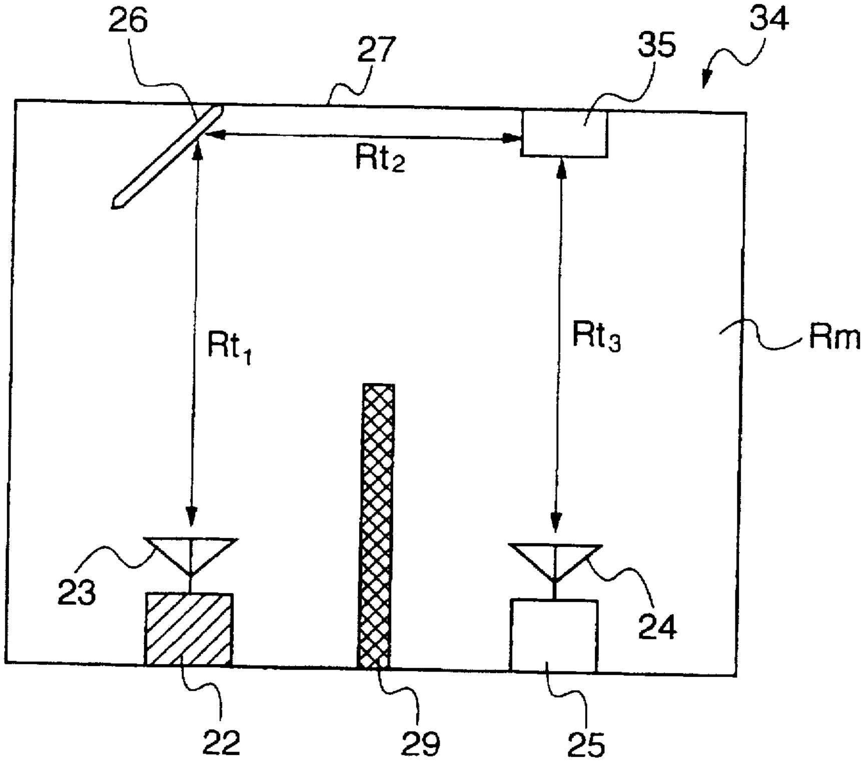
FIG. 6 is a conceptual view of an indoor radio communication system according to a fourth modification of the first embodiment of the present invention.

Also, as shown in FIG. 6, an indoor radio communication system 34 comprises the master station 22, the master antenna 23, the slave station 25, the slave antenna 24, the master reflecting plane mirror 26, a repeater station 35 for amplifying a high frequency signal transmitted from the slave antenna 24, transmitting the amplified signal to the mirror 26, amplifying a high frequency signal transmitted from the mirror 26 and transmitting the amplified signal to the slave antenna 24. In this case, because the signal is amplified by the repeater station 35, the signal can be reliably reproduced in the master or slave station 22 or 25.

Figure 7:
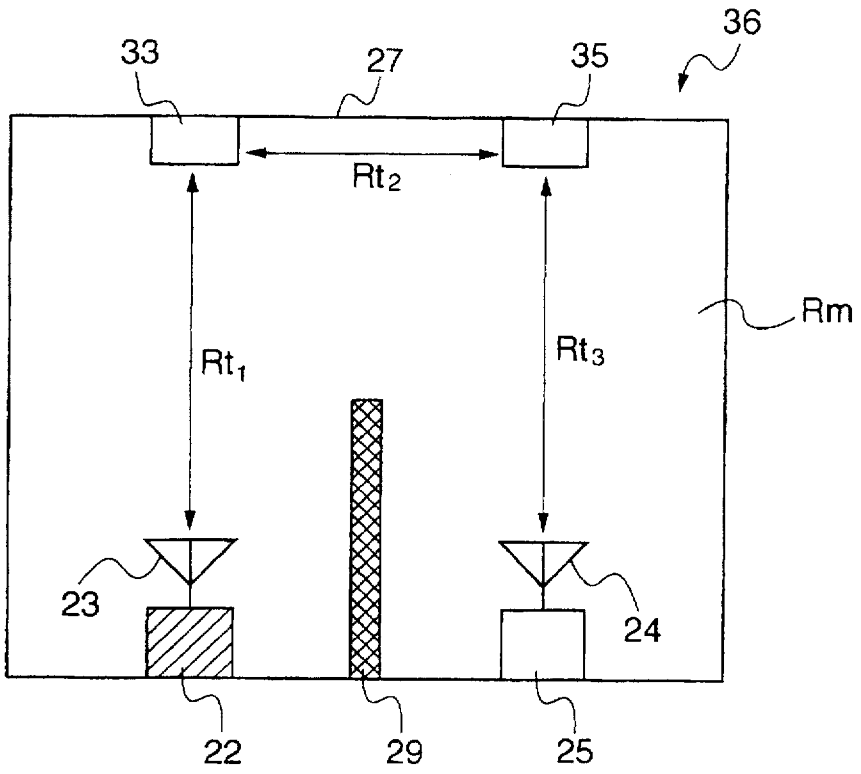
FIG. 7 is a conceptual view of an indoor radio communication system according to a fifth modification of the first embodiment of the present invention.

Also, as shown in FIG. 7, it is applicable that an indoor radio communication system 36 comprise the master station 22, the master antenna 23, the slave station 25, the slave antenna 24, the master reflecting plane mirror 26, the repeater station 33 and the repeater station 35.

In the repeater stations 33 and 35, the high frequency signal is directly amplified and transmitted. However, it is applicable that the high frequency signal be transformed into an intermediate frequency signal or a base band signal, the intermediate frequency signal or the base band signal be amplified, the amplified signal be transformed into a high frequency signal and the high frequency signal be transmitted. Also, it is applicable that the high frequency signal be transformed into an intermediate frequency signal or a base band signal, the intermediate frequency signal or the base band signal be amplified, the amplified signal be transformed into a transmitting frequency signal or be polarized and the transformed signal or the polarized signal be transmitted.

In the first embodiment, the high directivity of the master and slave antennas 23, 24, 31*a* and 31*b* denotes that a scattering property of the electric wave is suppressed by the directivity of the antennas 23, 24, 31*a* and 31*b*. For example, because a quasi-micro wave and a quasi-millimeter wave have a high rectilinear propagation property, the antennas 23, 24, 31*a* and 31*b* can be applied for the quasi-micro wave and the quasi-millimeter wave.

Also, the mirrors 26 and 28 and the repeater stations 33 and 35 are attached on the ceiling 27. However, it is applicable that the mirrors 26 and 28 and the repeater stations 33 and 35 be apart from the ceiling 27 and be placed just above or below the antennas 23 and 24.

Next, a second embodiment of the present invention is described with reference to FIGS. 8 and 9.

Figure 8:
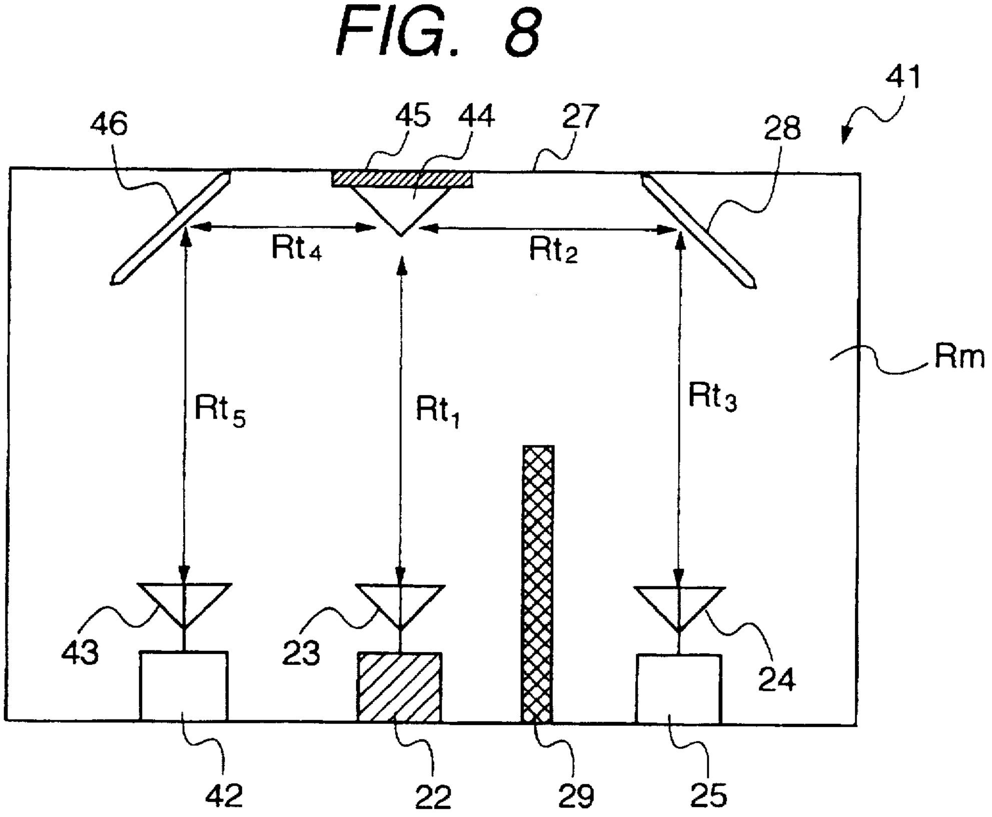
FIG. 8 is a conceptual view of an indoor radio communication system according to a second embodiment of the present invention.

FIG. 8 is a conceptual view of an indoor radio communication system according to a second embodiment of the present invention.

As shown in FIG. 8, an indoor radio communication system comprises the master station 22, the master antenna 23, the first slave station 25, the first slave antenna 24, a second slave station 42 for producing an electric wave carrying a data signal and detecting a data signal of a received electric wave, a second slave antenna 43, which is connected with the slave station 42 and has a high directivity in the upper direction, for radiating the electric wave at a narrowed beam width in a particular direction and receiving the electric wave transmitted from the particular direction, a master reflecting mirror 44 attached to the ceiling 27 of the room Rm for reflecting the electric wave radiated from the master antenna 23 in all horizontal directions of a horizontal plane parallel to the ceiling 27, an electric wave absorber 45 attached on the ceiling 27 to surround the master reflecting mirror the slave reflecting plane mirror 28 for again reflecting the electric wave reflected by the master reflecting mirror 44 to the slave antenna 24 and reflecting the electric wave radiated from the slave antenna 24 to the master reflecting mirror 44, and a second slave reflecting plane mirror 46 attached to the ceiling 27 for again reflecting the electric wave reflected by the master reflecting mirror 44 to the second slave antenna 43 and reflecting the electric wave radiated from the second slave antenna 43 to the master reflecting mirror 44.

A millimeter wave is, for example, used as the electric wave because the millimeter wave has a superior rectilinear propagation property.

Figure 9:
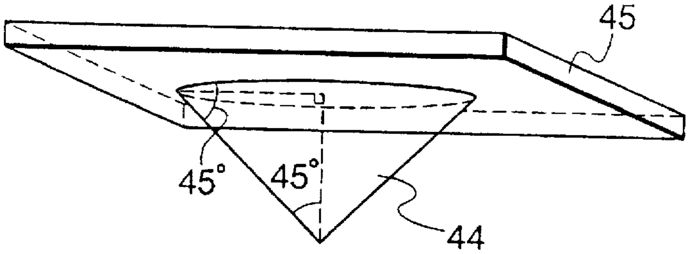
FIG. 9 is a diagonal view of a master reflecting mirror and an electric wave absorber shown in FIG. 8.

As shown in FIG. 9, the master reflecting mirror 44 is formed in an inverted cone shape having a vertical angle of 90 degrees, and the master reflecting mirror 44 is surrounded by the electric wave absorber 45.

In the above configuration, an operation of the indoor radio communication system 41 is described.

When an electric wave carrying a data signal is radiated from the master antenna 23, because the master antenna 23 has a high directivity in the upper direction, all of the electric wave passes through the transmission route Rt1 at a narrow beam width and is incident on the master reflecting mirror 44 placed almost above the master antenna 23. Thereafter, because a vertical angle of the master reflecting mirror 44 is 90 degrees, the electric wave is reflected by the master reflecting mirror 44 in all horizontal directions parallel to the ceiling 27. Also, even though a part of the electric wave is not incident on the master reflecting mirror 44 but is incident on a peripheral portion of the master reflecting mirror 44, the part of the electric wave is absorbed by the electric wave absorber 45 to prevent the generation of an unnecessary reflected wave or an unnecessary diffracted wave. Thereafter, a part of the electric wave is incident on the slave reflecting plane mirror 28 through the transmission route Rt2 and is reflected by the slave reflecting plane mirror 28 to the slave antenna 24. Also, another part of the electric wave is incident on the second slave reflecting plane mirror 46 through a transmission route Rt4 and is reflected by the second slave reflecting plane mirror 46 placed just above the second slave antenna 43 to the second slave antenna 43 through a transmission route Rt5 in the same manner because the second slave reflecting plane mirror 46 is inclined by 45 degrees with respect to the ceiling 27.

Therefore, the data signal carried by the electric wave is reliably transmitted from the master station 22 to the slave stations 25 and 42, and any distortion of the transmission signal does not occur because the generation of an unnecessary reflected wave or an unnecessary diffracted wave is prevented by the electric wave absorber 45.

Also, when an electric wave carrying a data signal is radiated from the slave antenna 24 or 43, the electric wave passes through the transmission routes Rt1 to Rt3 (or Rt1, Rt4 and Rt5) because of a reversibility principle of the electric wave transmission, and the electric wave is received by the master antenna 23. Therefore, a signal transmission from the slave station 25 or 42 to the master station 22 can be performed in the same manner.

Accordingly, because the master and slave antennas 23, 24 and 43 having the high directivity are used and the millimeter wave has a superior rectilinear propagation property, a data signal can reliably pass through a signal transmission route composed of the routes Rt1 to Rt3 (or Rt1, Rt4 and Rt5) and the master and slave reflecting mirrors 44, 28 and 46. That is, because the data signal does not pass through any other signal transmission route, the data signal received by the antenna 23, 24 or 43 is not distorted.

Also, even though the furniture 29 such as a partition screen or a person exists in the room Rm, the transmission of the signal is not interrupted by the furniture 29 or a person because the signal transmission route can be arbitrarily set by using the master and slave reflecting mirrors 44, 28 and 46. Therefore, a high data transmission can be stably performed at a high quality without applying a compensating technique such as an antenna diversity technique or an equalization technique for compensating for the cutoff of the signal transmission route and the distortion of the data signal, and the indoor radio communication system 41 can be downsized and manufactured at a low cost.

Also, in cases where the slave station 25 or 42 is moved to another position, because the electric wave is reflected by the master reflecting mirror 44 in all horizontal directions parallel to the ceiling 27, the slave reflecting plane mirror 28 or 46 is only moved with the slave station 25 or 42 to be placed just above the slave station 25 or 42. Therefore, because it is not required to adjust the master reflecting mirror 44, the slave station 25 or 42 can be easily moved while maintaining the high data transmission at a high quality, as compared with in the first embodiment.

Also, because the electric wave transmitted from the master antenna 23 is reflected in all horizontal directions parallel to the ceiling 27, a large number of slave stations and slave antennas can be set at arbitrary positions.

Also, in cases where a top vertex of the master reflecting mirror 44 is placed just above the master antenna 23, an intensity distribution of the electric wave reflected in all horizontal directions parallel to the ceiling 27 is isotropic because the master reflecting mirror 44 is formed in the inverted cone shape. Therefore, intensities of the electric waves received in a plurality of slave stations can be equalized with each other on condition that the slave stations are set at equidistant positions from the master station 22.

Also, in cases where a top vertex of the master reflecting mirror 44 is shifted from a position placed just above the master antenna 23, an intensity distribution of the electric wave reflected in all horizontal directions parallel to the ceiling 27 is anisotropic because the master reflecting mirror 44 is formed in the inverted cone shape. Therefore, even though a length of the transmission route Rt4 indicating a distance between the reflecting mirrors 44 and 46 differs from a length of the transmission route Rt2 indicating a distance between the reflecting mirrors 28 and 44, an intensity of the electric wave received by the second slave station 42 can be equalized with that received by the first slave station 25 by adjusting a relative position of the master reflecting mirror 44 with respect to the master antenna 23. For example, in cases where a length of the transmission route Rt4 indicating a distance between the reflecting mirrors 44 and 46 is longer than a length of the transmission route Rt2 indicating a distance between the reflecting mirrors 28 and 44, the position of the master reflecting mirror 44 is adjusted to be shifted toward the reflecting mirror 28.

In the second embodiment, the master reflecting mirror 44 is formed in the inverted cone shape. However, it is applicable that the master reflecting mirror 44 be formed in an inverted polygonal pyramid such as an inverted trigonal pyramid or an inverted quadrangular pyramid. In this case, because the electric wave is reflected by the master reflecting mirror 44 in a definite number of directions of a horizontal plane parallel to the ceiling 27, an indoor radio communication can be performed between the master station 22 and each of a definite number of slave stations.

Also, it is applicable that the electric wave absorber 30 is attached to periphery portions of the second slave reflecting plane mirror 46 to prevent the generation of an unnecessary reflected wave or an unnecessary diffracted wave and narrow a radiation beam width of the reflected wave. Also, it is applicable that the electric wave absorber 30 is attached on a portion of the ceiling 27 placed in the neighborhood of the second slave reflecting plane mirror 46 to prevent the generation of an unnecessary reflected wave or an unnecessary diffracted wave. Also, it is preferred that the circular polarization wave antennas 31*a* and 31*b* be used in place of the master and slave antennas 23, 24 and 43. In this case, the distortion of the data signal caused by the reception of the electric wave through an undesired data transmission path can be moreover prevented in the same manner as in the first embodiment. Also, it is applicable that the reflecting mirror 28 or 46 be replaced with the repeater station 33 or 35. Also, it is applicable that the mirrors 28, 44 and 46 and the repeater stations 33 and 35 be apart from the ceiling 27 and be placed just above or below the antennas 23, 24 and 43.

In the second embodiment, the high directivity of the master and slave antennas 23, 24, 31*a*, 31*b* and 43 denotes that a scattering property of the electric wave is suppressed by the directivity of the antennas 23, 24, 31*a*, 31*b* and 43. For example, because a quasi-micro wave and a quasi-millimeter wave have a high rectilinear propagation property, the antennas 23, 24, 31*a*, 31*b* and 43 can be applied for the quasi-micro wave and the quasi-millimeter wave.

Next, a third embodiment of the present invention is described with reference to FIGS. 10 and 11.

Figure 10:
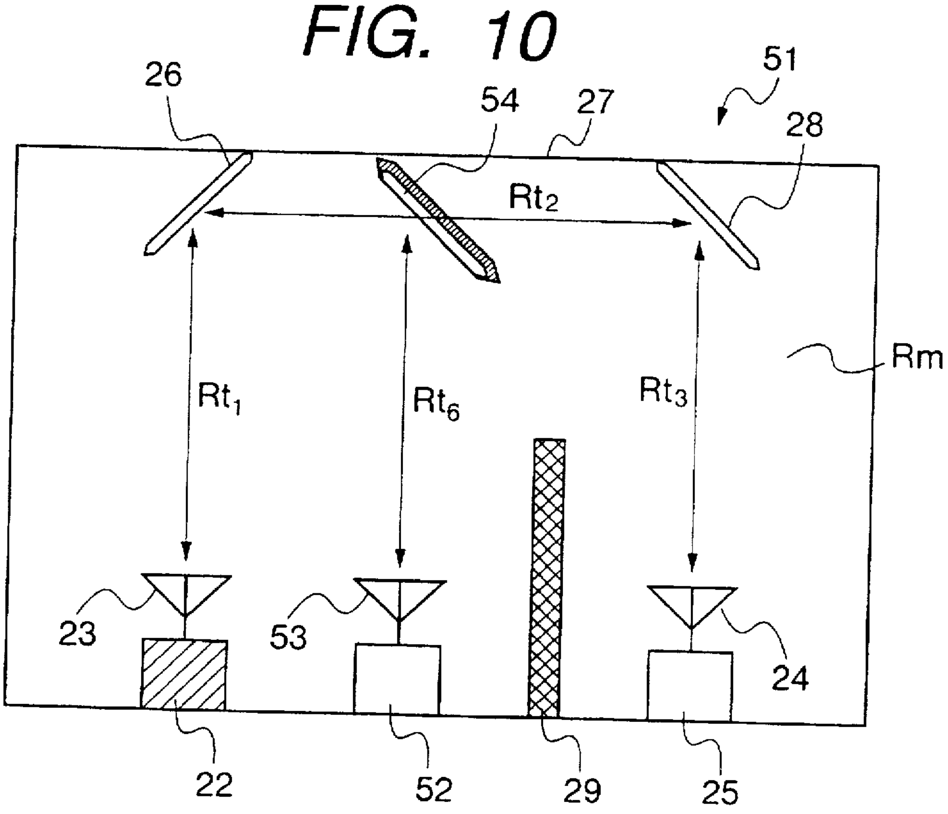
FIG. 10 is a conceptual view of an indoor radio communication system according to a third embodiment of the present invention.

FIG. 10 is a conceptual view of an indoor radio communication system according to a third embodiment of the present invention.

As shown in FIG. 10, an indoor radio communication system 51 comprises the master station 22, the master antenna 23, the first slave station 25, the first slave antenna 24, a second slave station 52 for producing an electric wave carrying a data signal and detecting a data signal of a received electric wave, a second slave antenna 53, which is connected with the slave station 52 and has a high directivity in the upper direction, for radiating the electric.wave at a narrowed beam width in.a particular direction and receiving the electric wave transmitted from the particular direction, the master reflecting plane mirror 26, the slave reflecting plane mirror 28, and a semi-transparent mirror 54 attached on the ceiling 27 for again reflecting a part of the electric wave reflected by the master reflecting plane mirror 26 to the second slave antenna 53 and passing a remaining part of the electric wave reflected by the master reflecting plane mirror 26 to the slave reflecting plane mirror 28.

A millimeter wave is, for example, used as the electric wave because the millimeter wave has a superior rectilinear propagation property.

Figure 11:
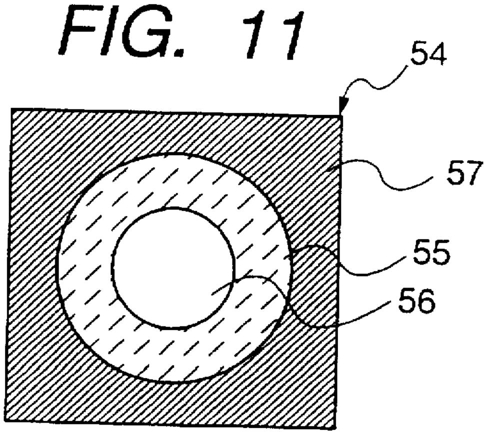
FIG. 11 is a plan view of a semi-transparent mirror shown in FIG. 10.

As shown in FIG. 11, the semi-transparent mirror 54 comprises an electric wave reflecting plane 55 having an electric wave passing hole 56, and an electric wave absorber 57 to surround the electric wave reflecting plane 55. The semi-transparent mirror 54 is placed to pass the electric wave reflected by the reflecting mirror 26 (or 28) to the reflecting mirror 28 (or 26) through the electric wave passing hole 56. Also, the semi-transparent mirror 54 is placed just above the second slave antenna 53 and is, for example, inclined by 45 degrees with respect to the ceiling 27 to reflect the electric wave reflected by the reflecting mirror 26 to the second slave antenna 53.

In the above configuration, an operation of the indoor radio communication system 51 is described.

When an electric wave carrying a data signal is radiated from the master antenna 23 at a narrow beam width, the electric wave is reflected by the master reflecting plane mirror 26 in the same manner as in the first embodiment. Thereafter, a part of the electric wave reflected passes through the electric wave passing hole 56 of the semi-transpar ent mirror 54 and is incident on the first slave reflecting plane mirror 28, and the part of the electric wave is received by the first slave antenna 24 in the same manner as in the first embodiment. Also, a remaining part of the electric wave reflected is reflected by the electric wave reflecting plane 55 of the semi-transparent mirror 54 and is received by the second slave antenna 53 through a transmission path Rt6. In this case, even though a part of the electric wave reflected is not incident on the electric wave reflecting plane 55 or the electric wave passing hole 56 but is incident on the electric wave absorber 57, the part of the electric wave is absorbed by the electric wave absorber 57 to prevent the generation of an unnecessary reflected wave or an unnecessary diffracted wave. Therefore, the data signal carried by the electric wave is reliably transmitted from the master station 22 to the slave stations 25 and 52, and any distortion of the transmission signal does not occur because the generation of an unnecessary reflected wave or an unnecessary diffracted wave is prevented by the electric wave absorber 57.

Also, when an electric wave carrying a data signal is radiated from the slave antenna 24 or 53, the electric wave passes through the transmission routes Rt1 to Rt3 (or Rt1, Rt2 and Rt6) because of a reversibility principle of the electric wave transmission, and the electric wave is received by the master antenna 23. Therefore, a signal transmission from the slave station 25 or 52 to the master station 22 can be performed in the same manner.

Accordingly, because the master and slave antennas 23, 24 and 53 having the high directivity are used and the millimeter wave has a superior rectilinear propagation property, a data signal can reliably pass through a signal transmission route composed of the routes Rt1 to Rt3 (or Rt1, Rt4 and Rt6) and the master and slave mirrors 26, 28 and 54. That is, because the data signal does not pass through any other signal transmission route, the data signal received by the antenna 23, 24 or 53 is not distorted.

Also, even though the furniture 29 such as a partition screen or a person exists in the room Rm, the transmission of the signal is not interrupted by the furniture 29 or a person because the signal transmission route can be arbitrarily set by using the master and slave mirrors 26, 28 and 54. Therefore, a high data transmission can be stably performed at a high quality without applying a compensating technique such as an antenna diversity technique or an equalization technique for compensating for the cutoff of the signal transmission route and the distortion of the data signal, and the indoor radio communication system 51 can be downsized and manufactured at a low cost.

In the third embodiment, the single electric wave passing hole 56 is provided for the mirror 54. However, it is applicable that a plurality of electric wave passing hole is provided for the mirror 54 and three or.more slave stations be set in the system 51.

Also, it is preferred that the circular polarization wave antennas 31*a* and 31*b* be used in place of the master and slave antennas 23, 24 and 53. In this case, the distortion of the data signal caused by the reception of the electric wave through an undesired data transmission path can be moreover prevented in the same manner as in the first embodiment.

Also, it is applicable that the mirrors 26, 28 and 54 be apart from the ceiling 27 and be placed just above or below the antennas 23, 24 and 53.

In the third embodiment, the high directivity of the master and slave antennas 23, 24, 31*a*, 31*b* and 53 denotes that a scattering property of the electric wave is suppressed by the directivity of the antennas 23, 24, 31*a*, 31*b* and 53. For example, because a quasi-micro wave and a quasi-millimeter wave have a high rectilinear propagation property, the antennas 23, 24, 31*a*, 31*b* and 53 can be applied for the quasi-micro wave and the quasi-millimeter wave.

Next, a fourth embodiment of the present invention is described with reference to FIGS. 12.

Figure 12:
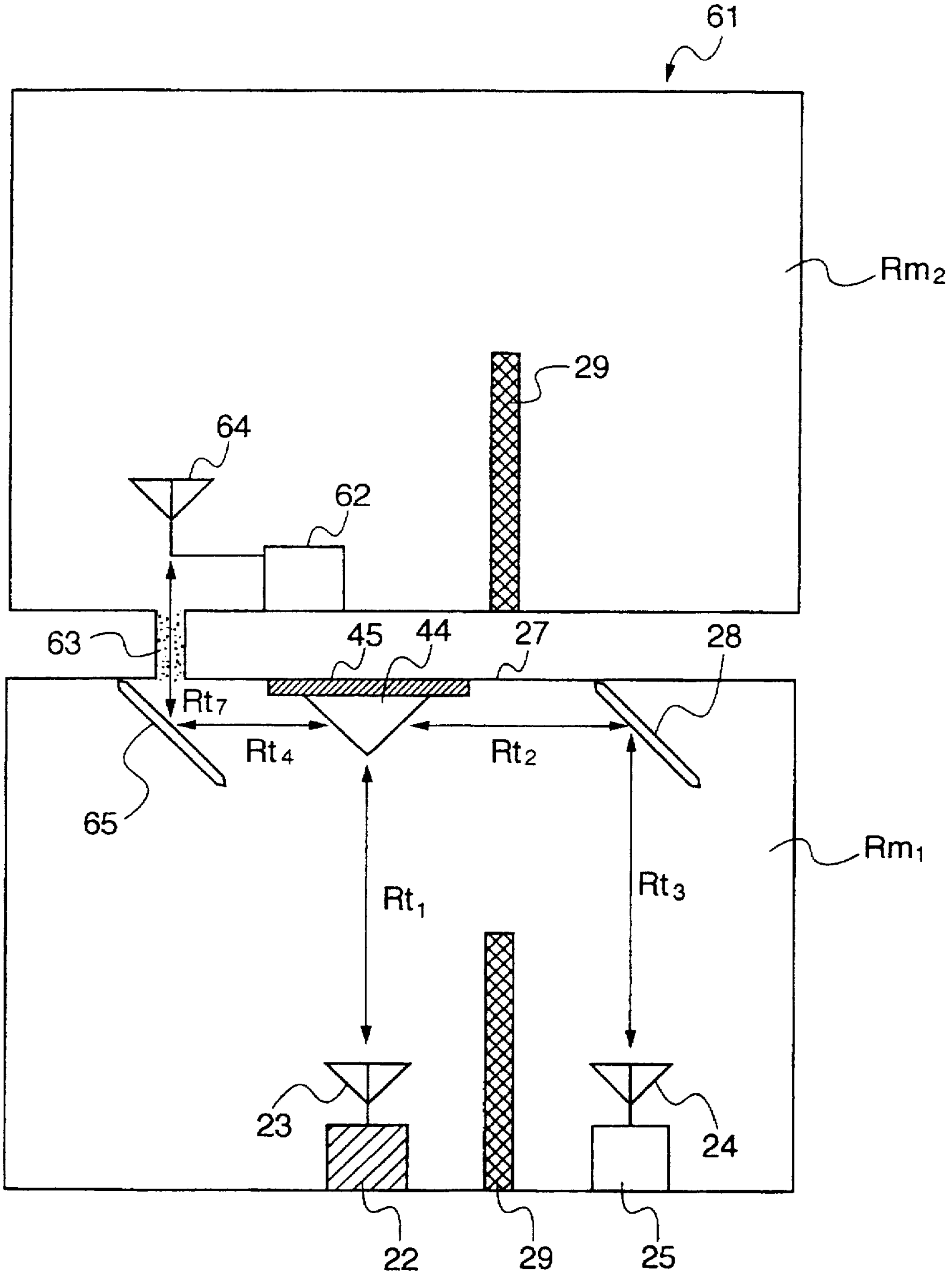
FIG. 12 is a conceptual view of an indoor radio communication system according to a fourth embodiment of the present invention.

FIG. 12 is a conceptual view of an indoor radio communication system according to a fourth embodiment of the present invention.

As shown in FIG. 12, an indoor radio communication system 61 comprises the master station 22 set in a first room Rm1, the master antenna 23 set in the first room Rm1, the first slave station 25 set in the first room Rm1, the first slave antenna 24 set in the first room Rm1, the slave reflecting plane mirror 28 set in the first room Rm1, the master reflecting mirror 44 set in the first room Rm1, the electric wave absorber 45, a second slave station 62, set in a second room Rm2 which is connected with the first room Rm1 placed at an upper position through an electric wave passing path 63, for producing an electric wave carrying a data signal and detecting a data signal of a received electric wave, a second slave antenna 64, which is connected with the second slave station 62 in the second room Rm2 and has a high directivity in the lower direction, for radiating the electric wave at a narrowed beam width in the lower direction through the electric wave passing path 63 and receiving the electric wave transmitted from the lower direction, and a slave reflecting plane mirror 65 attached to the ceiling 27 of the first room Rm1 for again reflecting the electric wave reflected by the master reflecting mirror 44 to the second slave antenna 64.

The slave reflecting plane mirror 65 is placed just below the second slave antenna 64 through the electric wave passing path 63 and is, for example, inclined by 45 degrees with respect to the ceiling 27 to reflect the electric wave reflected by the master reflecting mirror 44 to the second slave antenna 64. The electric wave passing path 63 is packed with a material having a high electric wave passing property. A millimeter wave is, for example, used as the electric wave because the millimeter wave has a superior rectilinear propagation property.

In the above configuration, an operation of the indoor radio communication system 61 is described.

When an electric wave carrying a data signal is radiated from the master antenna 23 at a narrow beam width, the electric wave is reflected by the master reflecting mirror 44 in all horizontal directions parallel to the ceiling 27, a part of the electric wave reflected is reflected by the slave mirror 28 and is received by the slave antenna 24 in the same manner as in the second embodiment. Also, another part of the electric wave reflected is reflected by the slave mirror 65 in the upper direction toward the electric wave passing path 63 and is incident on the second slave antenna 64 through a transmission route Rt7 after passing through the electric wave passing path 63. Thereafter, the part of the electric wave is received by the second slave antenna 64 because the second slave antenna 64 has a high directivity in the lower direction. Therefore, the data signal carried by the electric wave is reliably transmitted from the master station 22 to the slave stations 25 and 62, and any distortion of the transmission signal does not occur in the second slave station 62 because a passage for the electric wave is limited to the electric wave passing path 63 to prevent the generation of an unnecessary reflected wave or an unnecessary diffracted wave.

Also, when an electric wave carrying a data signal is radiated from the slave antenna 24 or 64, the electric wave passes through the transmission routes Rt1 to Rt3 (or Rt1, Rt4 and Rt7) because of a reversibility principle of the electric wave transmission, and the electric wave is received by the master antenna 23. Therefore, a signal transmission from the slave station 25 or 62 to the master station 22 can be performed in the same manner.

Accordingly, because the master and slave antennas 23, 24 and 64 having the high directivity are used and the millimeter wave has a superior rectilinear propagation property, a data signal can reliably pass through a signal transmission route composed of the routes Rt1 to Rt3 (or Rt1, Rt4 and Rt7) and the master and slave reflecting mirrors 28, 44 and 65. That is, because the data signal does not pass through any other signal transmission route, the data signal received by the antenna 23, 24 or 64 is not distorted.

Also, because the electric wave passing path 63 connecting the first room Rm1 with the second room Rm2 is provided, it is not required to set a master station and antenna in the second room Rm2. The indoor radio communication system 61 can be manufactured at a low cost even though a plurality of slave stations are set in a plurality of rooms.

Also, even though the furniture 29 such as a partition screen or a person exists in the rooms Rm1 and Rm2, the transmission of the signal is not interrupted by the furniture 29 or a person because the signal transmission route can be arbitrarily set by using the master and slave mirrors 28, 44 and 65.

In the fourth embodiment, the second room Rm2 is placed at the upper position of the first room Rm1. However, it is applicable that the second room Rm2 be placed at the lower or side position of the first room Rm1.

Also, it is preferred that the circular polarization wave antennas **31*a* and 31*b* be used in place of the master and slave antennas 23, 24 and 64**. In this case, the distortion of the data signal caused by the reception of the electric wave through an undesired data transmission path can be moreover prevented in the same manner as in the first embodiment.

Also, it is applicable that the mirrors 28, 44 and 65 be apart from the ceiling 27 and be placed just above or below the antennas 23, 24 and 64.

In the fourth embodiment, the high directivity of the master and slave antennas 23, 24, **31*a*, 31*b* and 64 denotes that a scattering property of the electric wave is suppressed by the directivity of the antennas 23, 24, 31*a*, 31*b* and 64. For example, because a quasi-micro wave and a quasi-millimeter wave have a high rectilinear propagation property, the antennas 23, 24, 31*a*, 31*b* and 64** can be applied for the quasi-micro wave and the quasi-millimeter wave.

Next, a fifth embodiment of the present invention is described with reference to FIG. 13.

Figure 13:
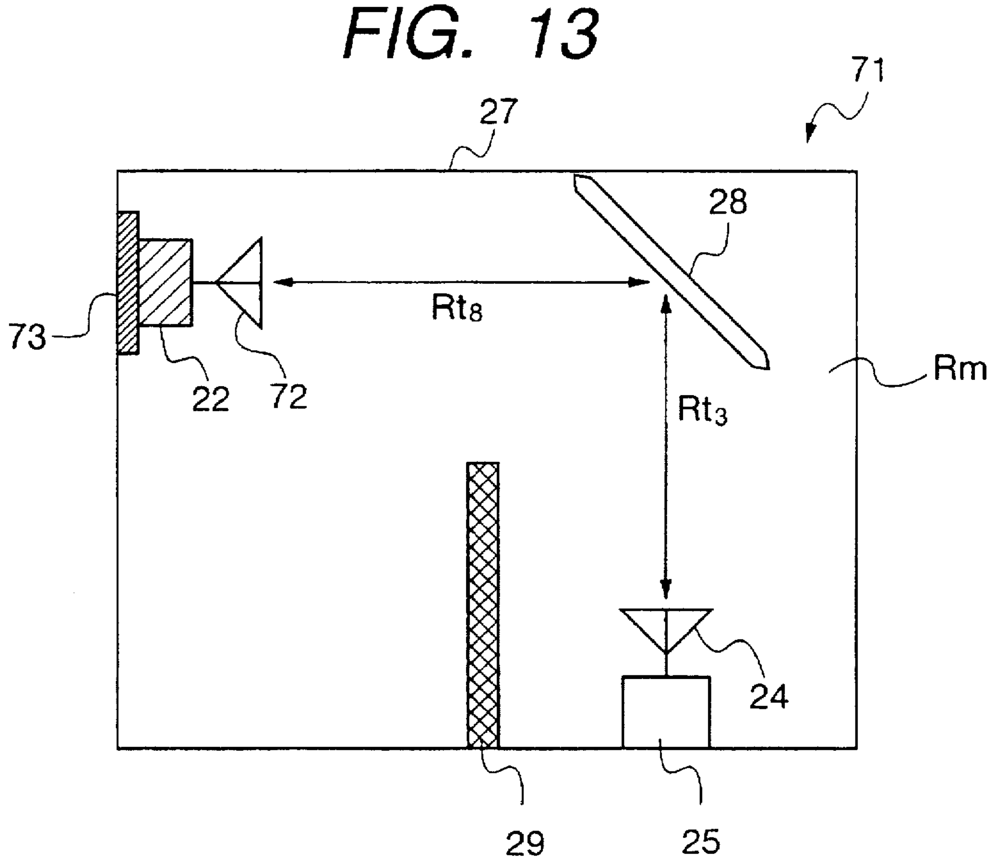
FIG. 13 is a conceptual view of an indoor radio communication system according to a fifth embodiment of the present invention.

FIG. 13 is a conceptual view of an indoor radio communication system according to a fifth embodiment of the present invention.

As shown in FIG. 13, an indoor radio communication system 71 comprises the master station 22 set on an upper side wall of the room Rm, a master antenna 72, which has a high directivity in all horizontal directions and is connected with the master station 22 on the upper side wall of the room Rm, for radiating an electric wave in all horizontal directions of a thinned plane parallel to the ceiling 27, the slave station 25, the slave antenna 24, the slave reflecting plane mirror 28 for reflecting the electric wave radiated from the master antenna 23 to the slave antenna 24 and reflecting the electric wave radiated from the slave antenna 24 to the master antenna 23, and an electric wave absorber 73 arranged on the upper side wall to surround the master station 22.

A millimeter wave is, for example, used as the electric wave because the millimeter wave has a superior rectilinear propagation property.

In the above configuration, when an electric wave carrying a data signal is radiated from the master antenna 23, the electric wave is spread in all horizontal directions of a thinned plane parallel to the ceiling 27 because the master antenna 23 is placed on the master station 22 set on an upper side wall of the room Rm. Therefore, a part of the electric wave passing through a transmission route Rt8 near the ceiling 27 in a horizontal direction parallel to the ceiling 27 is reflected by the slave reflecting plane mirror 28 and is transmitted to the slave antenna 24. Therefore, the data signal carried by the electric wave is reliably transmitted from the master station 22 to the slave station 25 even though any master mirror is not provided for the system 71, and any distortion of the transmission signal does not occur in the slave station 24 because all of the electric wave is radiated in all horizontal directions of a thinned plane parallel to the ceiling 27.

In this case, it is preferred that an electric wave absorber be arranged around the slave mirror 28 or on the ceiling 27 near the slave mirror 28. In this case, because the generation of an unnecessary reflected wave or an unnecessary diffracted wave is prevented by the electric wave absorber, the transmission signal received by the slave antenna 24 can be reproduced at a high quality.

Also, when an electric wave carrying a data signal is radiated from the slave antenna 24, the electric wave passes through the transmission routes Rt3 to Rt8 because of a reversibility principle of the electric wave transmission, and the electric wave is received by the master antenna 23. Therefore, a signal transmission from the slave station 25 to the master station 22 can be performed in the same manner. In this case, even though a part of the electric wave reflected is not incident on the master antenna 23 but passes through a peripheral portion of the master antenna 23, because the part of the electric wave is absorbed by the electric wave absorber 73, the generation of an unnecessary reflected wave or an unnecessary diffracted wave is prevented by the electric wave absorber 73, and the transmission signal received by the master antenna 23 can be reproduced at a high quality.

Accordingly, because any master mirror is not required, the configuration of the system 71 can be simplified. Also, because a transmission distance between the master and slave antennas 23 and 24 can be shortened, an electric power required for the transmission of the electric wave can be reduced.

Also, because all of the electric wave is radiated in all horizontal directions of a thinned plane parallel to the ceiling 27, the electric wave can be reflected by the slave mirror 28 even though the slave mirror 28 is placed anywhere near the ceiling 27. Therefore, the position of the slave station 25 can be arbitrary determined.

Also, even though the furniture 29 such as a partition screen or a person exists in the room Rm, the transmission of the signal is not interrupted by the furniture 29 or a person because the signal transmission route is limited to an area near to the ceiling 27 and a vertical area between the slave mirror 28 and the slave antenna 24.

Figure 14:
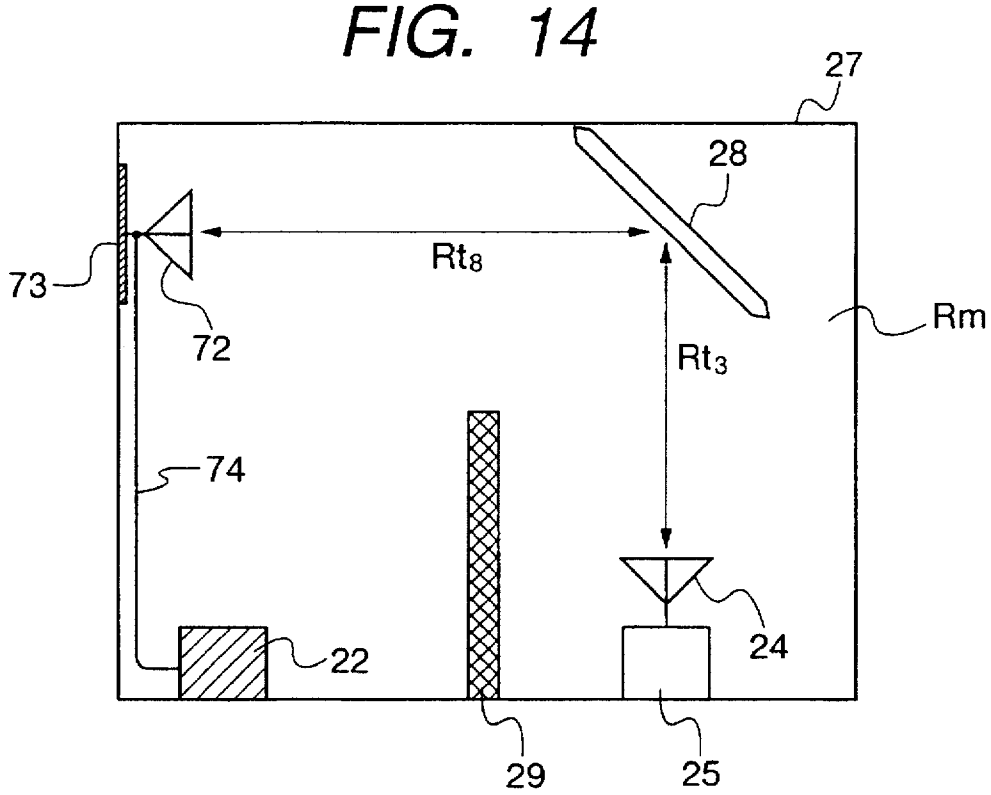
FIG. 14 is a conceptual view of an indoor radio communication system according to a first modification of the fifth embodiment of the present invention.
Figure 15:
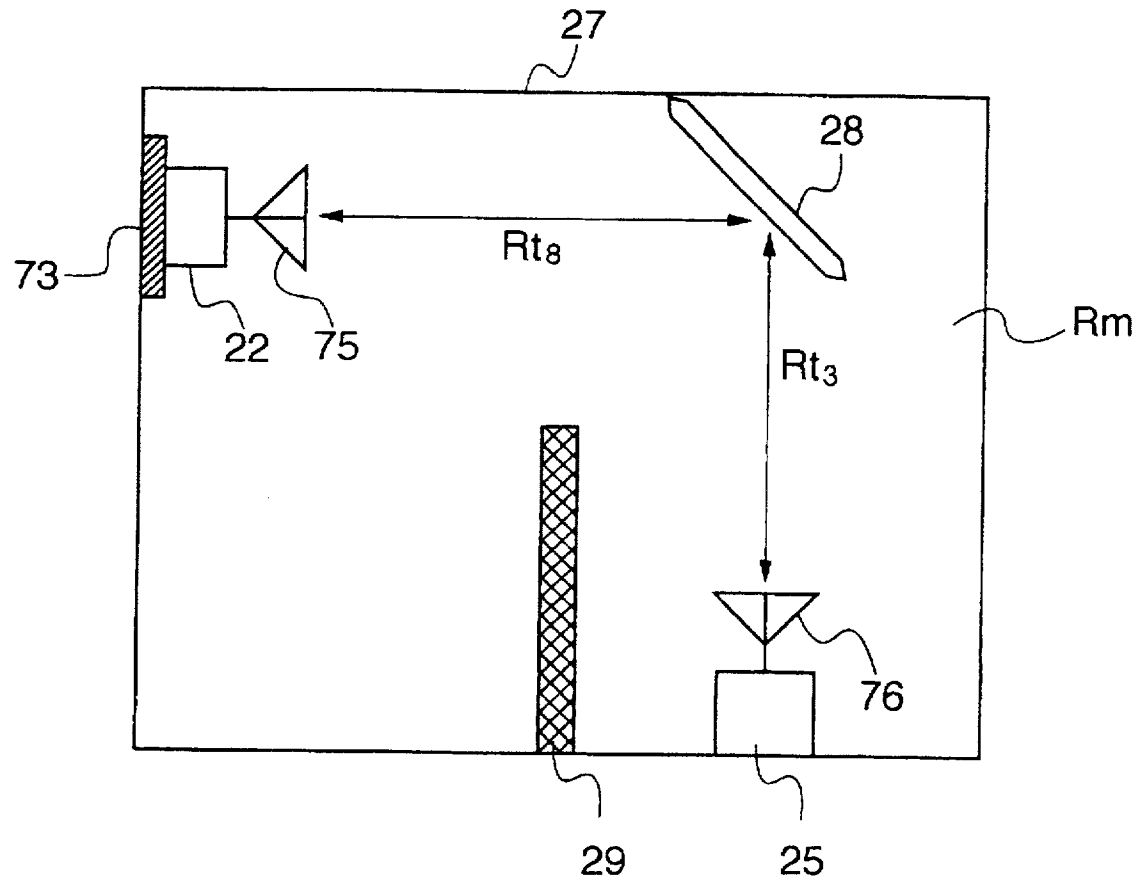
FIG. 15 is a conceptual view of an indoor radio communication system according to a second modification of the fifth embodiment of the present invention.

In the fourth embodiment, the master station 22 is placed on the upper side wall of the room Rm. However, as shown in FIG. 14, it is applicable that the master station 22 be placed on a floor of the room Rm or a desk and the master antenna 23 connected with the master station 22 through a cable 74 be placed on the upper side wall of the room Rm. Also, it is applicable that the master antenna 23 connected with the master station 22 through the cable 74 be placed on the ceiling 27.

Also, it is applicable that the master antenna 23 be used in place of the master antenna 72 in the same manner as in the first embodiment.

Also, it is preferred that a master circular polarization wave antenna 75 for radiating an electric wave circularly polarized in a first circular direction and receiving an electric wave circularly polarized in the first circular direction be used in place of the master antenna 23 and a slave circular polarization wave antenna 76 for radiating an electric wave circularly polarized in a second circular direction opposite to the first circular direction and receiving an electric wave circularly polarized in the second circular direction be used in place of the slave antenna 24. In this case, a polarization direction of the electric wave radiated from the master circular polarization wave antenna 75 is changed to the second circular direction when the electric wave is received by the slave circular polarization wave antenna 76, and a polarization direction of the electric wave radiated from the slave circular polarization wave antenna 76 is changed to the first circular direction when the electric wave is received by the master circular polarization wave antenna 75. Therefore, the distortion of the data signal caused by the reception of the electric wave through an undesired data transmission path can be moreover prevented, in the same manner as in the system shown in FIG. 4.

In the fifth embodiment, the high directivity of the master and slave antennas 23, 24, 75 and 76 denotes that a scattering property of the electric wave is suppressed by the directivity of the antennas 23, 24, 75 and 76. For example, because a quasi-micro wave and a quasi-millimeter wave have a high rectilinear propagation property, the antennas 23, 24, 75 and 76 can be applied for the quasi-micro wave and the quasi-millimeter wave.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An indoor radio communication system arranged in a room, comprising:

a master antenna in the room having a high directivity for radiating an electric wave at a narrowed beam width in a first vertical direction, the electric wave carrying a data signal;

a first electric wave receiving/transmitting means in the room for receiving the electric wave radiated from the master antenna in the first vertical direction and transmitting the electric wave in a horizontal direction;

a second electric wave receiving/transmitting means in the room for receiving the electric wave transmitted in the horizontal direction by the first electric wave receiving/transmitting means and transmitting the electric wave in a second vertical direction opposite to the first vertical direction; and a slave antenna in the room having a high directivity for receiving the electric wave transmitted in the second vertical direction by the same electric wave receiving/transmitting means.

2. An indoor radio communication system according to claim 1, further comprising:

an electric wave absorber, surrounding the first electric wave receiving/transmitting means or the second electric wave receiving/transmitting means, for absorbing a part of the electric wave incident on an area surrounding the first electric wave receiving/transmitting means or the second electric wave receiving/transmitting means.

3. An indoor radio communication system according to claim 1 in which the master antenna is a master circular polarization wave antenna for radiating the electric wave circularly polarized in a circular direction, and the slave antenna is a slave circular polarization wave antenna for receiving the electric wave circularly polarized in the same circular direction, the electric wave passing through the first and second electric wave receiving/transmitting means being circularly polarized in the same circular direction as that of the electric wave radiated from the master circular polarization wave antenna and being received by the slave circular polarization wave antenna.

4. An indoor radio communication system according to claim 1 in which the first electric wave receiving/transmitting means is a reflecting mirror for reflecting the electric wave transmitted from the first vertical direction in the horizontal direction, and the second electric wave receiving/transmitting means is a reflecting mirror for reflecting the electric wave transmitted from the horizontal direction in the second vertical direction.

5. An indoor radio communication system according to claim 1 in which the first electric wave receiving/transmitting means is a repeater station for amplifying the data signal carried by the electric wave and transmitting the electric wave carrying the amplified data signal to the second electric wave receiving/transmitting means, and the second electric wave receiving/transmitting means is a reflecting mirror for reflecting the electric wave transmitted from the horizontal direction in the second vertical direction.

6. An indoor radio communication system according to claim 1 in which the first electric wave receiving/transmitting means is a reflecting mirror for reflecting the electric wave transmitted from the first vertical direction in the horizontal direction, and the second electric wave receiving/transmitting means is a repeater station for amplifying the data signal carried by the electric wave and transmitting the electric wave carrying the amplified data signal to the slave antenna.

7. An indoor radio communication system according to claim 1. in which the first electric wave receiving/transmitting means is a repeater station for amplifying the data signal carried by the electric wave and transmitting the electric wave carrying the amplified data signal to the second electric wave receiving/transmitting means, and the second electric wave receiving/transmitting means is a repeater station for amplifying the data signal carried by the electric wave and transmitting the electric wave carrying the amplified data signal to the slave antenna.

8. An indoor radio communication system according to claim 1 in which the first electric wave receiving/transmitting means is a master reflecting mirror formed in an inverted cone shape for uniformly reflecting the electric wave in all horizontal directions of a horizontal plane.

9. An indoor radio communication system according to claim 8 in which a vertical angle of the master reflecting mirror is 90 degrees.

10. An indoor radio communication system according to claim 8, further comprising:

one or more second slave antennas; and a third electric wave receiving/transmitting means corresponding to each of the second slave antennas for receiving a part of the electric wave transmitted in one of the horizontal directions by the master reflecting mirror and transmitting the part of the electric wave to one corresponding second slave antenna placed in the second vertical direction.

11. An indoor radio communication system according to claim 1 in which the first electric wave receiving/transmitting means is a master reflecting mirror formed in an inverted polygonal pyramid for reflecting the electric wave in a definite number of horizontal directions of a horizontal plane.

12. An indoor radio communication system according to claim 11 in which a vertical angle of the master reflecting mirror is 90 degrees.

13. An indoor radio communication system according to claim 11, further comprising:

a third electric wave receiving/transmitting means for receiving a part of the electric wave transmitted in each horizontal direction by the master reflecting mirror and transmitting the part of the electric wave in the second vertical direction; and a second slave antenna for receiving the part of the electric wave transmitted from the third electric wave receiving/transmitting means.

14. An indoor radio communication system according to claim 1, further comprising:

a third electric wave receiving/transmitting means for receiving the electric wave transmitted in the horizontal direction by the first electric wave receiving/transmitting means and transmitting the electric wave in the second vertical direction, a distance between the first electric wave receiving/transmitting means and the third electric wave receiving/transmitting means being shorter than that between the first electric wave receiving/transmitting means and the second electric wave receiving/transmitting means; and a second slave antenna having a high directivity for receiving the electric wave transmitted in the second vertical direction by the third electric wave receiving/transmitting means, and the first electric wave receiving/transmitting means being a master reflecting mirror formed in an inverted cone shape for uniformly reflecting the electric wave in all horizontal directions of a horizontal plane, a top vertex of the master reflecting mirror being shifted from a position placed just above the master antenna toward the second electric wave receiving/transmitting means to equalize an intensity of the electric wave received by the second electric wave receiving/transmitting means with that received by the third electric wave receiving/transmitting means.

15. An indoor radio communication system according to claim 1, further comprising:

a semi-transparent mirror for reflecting a part of the electric wave transmitted from the first electric wave receiving/transmitting means in the second vertical direction and passing a remaining part of the electric wave to the second electric wave receiving/transmitting means; and a second slave antenna for receiving the part of the electric wave reflected by the semi-transparent mirror.

16. An indoor radio communication system according to claim 15 in which the semi-transparent mirror comprises an electric wave reflecting plane having an electric wave passing hole.

17. An indoor radio communication system according to claim 15 in which the semi-transparent mirror comprises:

an electric wave reflecting plane having an electric wave passing hole; and an electric wave absorber arranged around the electric wave reflecting plane for absorbing a part of the electric wave not incident on the electric wave reflecting plane.

18. An indoor radio communication system, comprising:

a master antenna having a high directivity for radiating an electric wave at a narrowed beam width in a first vertical direction, the master antenna being set in a first room, and the electric wave carrying a data signal;

a first electric wave receiving/transmitting means set in the first room for receiving the electric wave radiated from the master antenna in the first vertical direction and transmitting the electric wave in a horizontal direction;

a second electric wave receiving/transmitting means set in the first room for receiving the electric wave transmitted in the horizontal direction by the first electric wave receiving/transmitting means and transmitting the electric wave to a second room through an electric wave path; and a slave antenna having a high directivity for receiving the electric wave transmitted through the electric wave path by the second electric wave receiving/transmitting means, the first slave antenna being set in the second room.

19. An indoor radio communication system according to claim 18 in which said master antenna is movably set in the first room and said slave antenna is movably set in the second room, said first electric wave receiving/transmitting means comprises a first reflecting mirror, said first reflecting mirror having a changeable angle of orientation, and said second electric wave receiving/transmitting means comprises a second reflecting mirror, said second reflecting mirror having a changeable angle of orientation.

20. An indoor radio communication system according to claim 19, further comprising:

an electric wave absorber, surrounding the first reflecting mirror or the second reflecting mirror, for absorbing a part of the electric wave incident an area surrounding on the first reflecting mirror on the second reflecting mirror.

21. An indoor radio communication system according to claim 19 in which the master antenna is a master circular polarization wave antenna for radiating the electric wave circularly polarized in a circular direction, and the slave antenna is a slave circular polarization wave antenna for receiving the electric wave circularly polarized in the same circular direction, the electric wave passing through the first and second reflecting mirrors being circularly polarized in the same circular direction as that of the electric wave radiated from the master circular polarization wave antenna and being received by the slave circular polarization wave.

22. An indoor radio communication system according to claim 19, further comprising:

a third reflecting mirror set in the first room for receiving the electric wave transmitted in the horizontal direction by the first reflecting mirror and transmitting the electric wave in the second vertical direction, a distance between the first reflecting mirror and the third reflecting mirror being shorter than that between the first reflecting mirror and the second reflecting mirror; and a second slave antenna having a high directivity for receiving the electric wave transmitted in the second vertical direction by the third reflecting mirror, the second slave antenna being set in the first room, and the first reflecting mirror being a master reflecting mirror formed in an inverted cone shape for uniformly reflecting the electric wave in all horizontal directions of a horizontal plane, a top vertex of the master reflecting mirror being shifted from a position placed just above the master antenna toward the second reflecting mirror to equalize an intensity of the electric wave received by the second reflecting mirror with that received by the third reflecting mirror.

23. An indoor radio communication system according to claim 18 in which the first electric wave receiving/transmitting means is a repeater station for amplifying the data signal carried by the electric wave and transmitting the electric wave carrying the amplified data signal to the second electric wave receiving/transmitting means, and the second electric wave receiving/transmitting means is a reflecting mirror for reflecting the electric wave transmitted from the horizontal direction in the second vertical direction.

24. An indoor radio communication system according to claim 18 in which the first electric wave receiving/transmitting means is a reflecting mirror for reflecting the electric wave transmitted from the first vertical direction in the horizontal direction, and the second electric wave receiving/transmitting means is a repeater station for amplifying the data signal carried by the electric wave and transmitting the electric wave carrying the amplified data signal to the slave antenna.

25. An indoor radio communication system according to claim 18 in which the first electric wave receiving/transmitting means is a repeater station for amplifying the data signal carried by the electric wave and transmitting the electric wave carrying the amplified data signal to the second electric wave receiving/transmitting means, and the second electric wave receiving/transmitting means is a repeater station for amplifying the data signal carried by the electric wave and transmitting the electric wave carrying the amplified data signal to the slave antenna.

26. An indoor radio communication system according to claim 19 in which the first reflecting mirror is a master reflecting mirror formed in an inverted cone shape for uniformly reflecting the electric wave in all horizontal directions of a horizontal plane.

27. An indoor radio communication system according to claim 26 in which a vertical angle of the master reflecting mirror is 90 degrees.

28. An indoor radio communication system according to claim 26, further comprising:

one or more second slave antennas set in the first or second room; and a third reflecting mirror corresponding to each of the second slave antennas for receiving a part of the electric wave transmitted in one of the horizontal directions by the master reflecting mirror and transmitting the part of the electric wave to one corresponding second slave antenna placed in the second vertical direction.

29. An indoor radio communication system according to claim 19 in which the first reflecting mirror is a master reflecting mirror formed in an inverted polygonal pyramid for reflecting the electric wave in a definite number of horizontal directions of a horizontal plane.

30. An indoor radio communication system according to claim 29 in which a vertical angle of the master reflecting mirror is 90 degrees.

31. An indoor radio communication system according to claim 29, further comprising:

a third reflecting mirror set in the first or second room for receiving a part of the electric wave transmitted in each horizontal direction by the master reflecting mirror and transmitting the part of the electric wave in the second vertical direction; and a second slave antenna set in the first or second room for receiving the part of the electric wave transmitted from the third reflecting mirror.

32. An indoor radio communication system according to claim 19, further comprising:

a semi-transparent mirror set in the first room for reflecting a part of the electric wave transmitted from the first reflecting mirror in the second vertical direction and passing a remaining part of the electric wave to the second reflecting mirror; and a second slave antenna set in the first room for receiving the part of the electric wave reflected by the semi-transparent mirror.

33. An indoor radio communication system according to claim 32 in which the semi-transparent mirror comprises an electric wave reflecting plane having an electric wave passing hole.

34. An indoor radio communication system according to claim 32 in which the semi-transparent mirror comprises:

an electric wave reflecting plane having an electric wave passing hole; and an electric wave absorber arranged around the electric wave reflecting plane for absorbing a part of the electric wave incident on an area surrounding the electric wave reflecting plane.

35. An indoor radio communication system, comprising:

a master antenna having a high directivity for radiating an electric wave in all horizontal directions of a thinned horizontal plane near a ceiling of a room, the electric wave carrying a data signal;

a first electric wave receiving/transmitting means for receiving the electric wave radiated from the master antenna in one of the horizontal directions and transmitting the electric wave in a lower direction; and a slave antenna having a high directivity for receiving the electric wave transmitted by the first electric wave receiving/transmitting means in the lower direction.

36. An indoor radio communication system according to claim 35 in which the first electric wave receiving/transmitting means comprises a reflecting mirror.

37. An indoor radio communication system according to claim 36, further comprising:

an electric wave absorber, surrounding the first electric wave receiving/transmitting means, for absorbing a part of the electric wave incident on an area surrounding the first electric wave receiving/transmitting means.

38. An indoor radio communication system according to claim 36 in which the master antenna is a master circular polarization wave antenna for radiating the electric wave circularly polarized in a first circular direction, and the slave antenna is a slave circular polarization wave antenna for receiving the electric wave circularly polarized in a second circular direction opposite to the first circular direction, the electric wave passing through the first reflecting mirror being circularly polarized in the second circular direction and being received by the slave circuit polarization wave antenna.

39. An indoor radio communication system according to claim 36, further comprising:

a master station, arranged on an upper side wall of the room, for producing the electric wave carrying the data signal; and a slave station for detecting the data signal from the electric wave received by the slave antenna.

40. An indoor radio communication system according to claim 36, further comprising:

a master station, arranged on a floor of the room, for producing the electric wave carrying the data signal;

a cable for transmitting the electric wave produced by the master station to the master antenna; and a slave station for detecting the data signal from the electric wave received by the slave antenna.

41. An indoor radio communication system according to claim 35 in which the first electric wave receiving/transmitting means is a repeater station for amplifying the data signal carried by the electric wave and transmitting the electric wave carrying the amplified data signal to the slave antenna.

* * * * *